United States Patent [19]

Rouse et al.

[11] Patent Number: 4,804,031

[45] Date of Patent: Feb. 14, 1989

[54] TIRE REMOVAL APPARATUS

[75] Inventors: Michael W. Rouse, West Linn; Robert L. Thelen, Woodburn, both of Oreg.

[73] Assignee: Waste Recovery, Inc., Dallas, Tex.

[21] Appl. No.: 38,282

[22] Filed: Apr. 14, 1987

[51] Int. Cl.⁴ ............................................. B60C 25/07
[52] U.S. Cl. ..................................... 157/1.21; 72/412; 29/403.3; 29/426.4; 100/269 R
[58] Field of Search ................. 72/389, 412; 29/403.1, 29/403.2, 802, 566, 283.5, 426.4, 403.3; 157/1.2, 1.21; 100/269 R

[56] References Cited

U.S. PATENT DOCUMENTS

| | | | |
|---|---|---|---|
| 1,562,626 | 11/1925 | Finkbeiner | 72/311 |
| 3,020,831 | 2/1962 | Barnes | 100/232 |
| 3,643,590 | 2/1972 | Aluotto | 100/42 |
| 3,885,292 | 5/1975 | Sharp et al. | 29/403 |
| 4,050,144 | 9/1977 | de Massacre | 29/427 |
| 4,080,887 | 3/1978 | Larsen | 100/35 |
| 4,083,394 | 4/1978 | Heikkinen et al. | 157/1.21 |
| 4,254,651 | 3/1981 | Kelly | 72/389 |
| 4,255,958 | 3/1981 | Strong | 72/389 |
| 4,265,106 | 5/1981 | McMaster et al. | 72/389 |
| 4,306,606 | 12/1981 | Grasso | 157/1.1 |
| 4,485,664 | 12/1984 | Richards | 72/389 |

FOREIGN PATENT DOCUMENTS 124090  3/1919  United Kingdom .................. 72/389

Primary Examiner—Daniel C. Crane
Attorney, Agent, or Firm—Chernoff, Vilhauer, McClung & Stenzel

[57] ABSTRACT

Apparatus for separating rubber tires from discarded metal wheels and for breaking large pieces of wood and the like into smaller pieces has a linear motor which drives a ram to crush a wheel rim, permitting it to fall free from a tire originally mounted thereon. A punch punctures inflated tires. A transverse arm structure includes sockets which hold vertical pins used to support long pieces of wood and the like while the ram is used to break them into smaller lengths. A blade which may be attached to the ram is usable to cut very large tires along radial planes to reduce such tires into smaller sections preparatory to further processing.

14 Claims, 2 Drawing Sheets

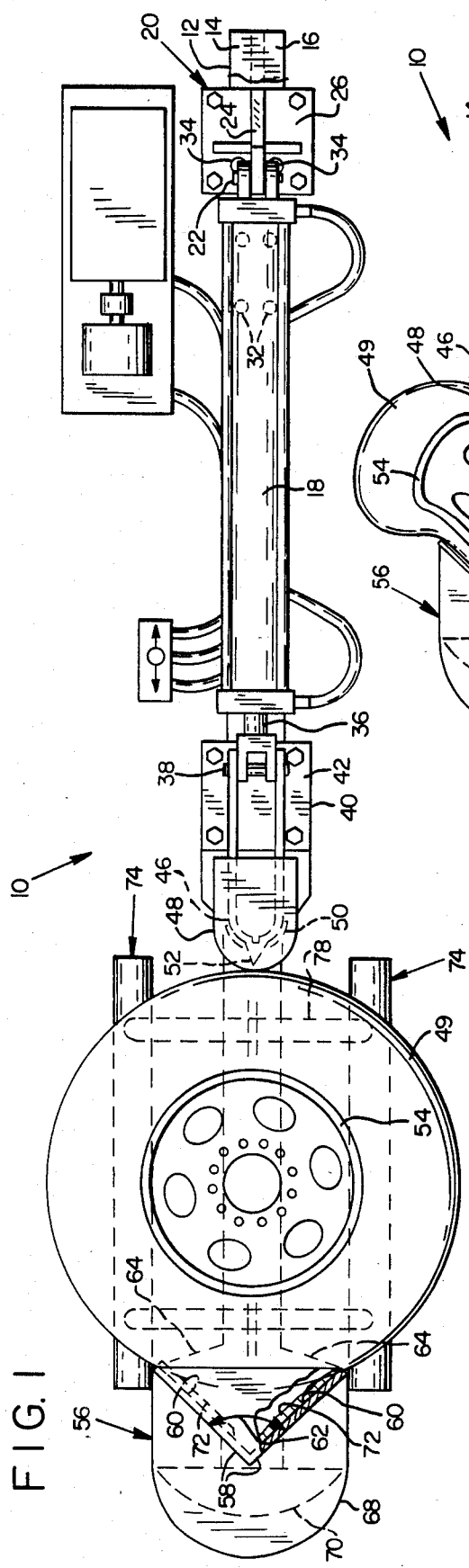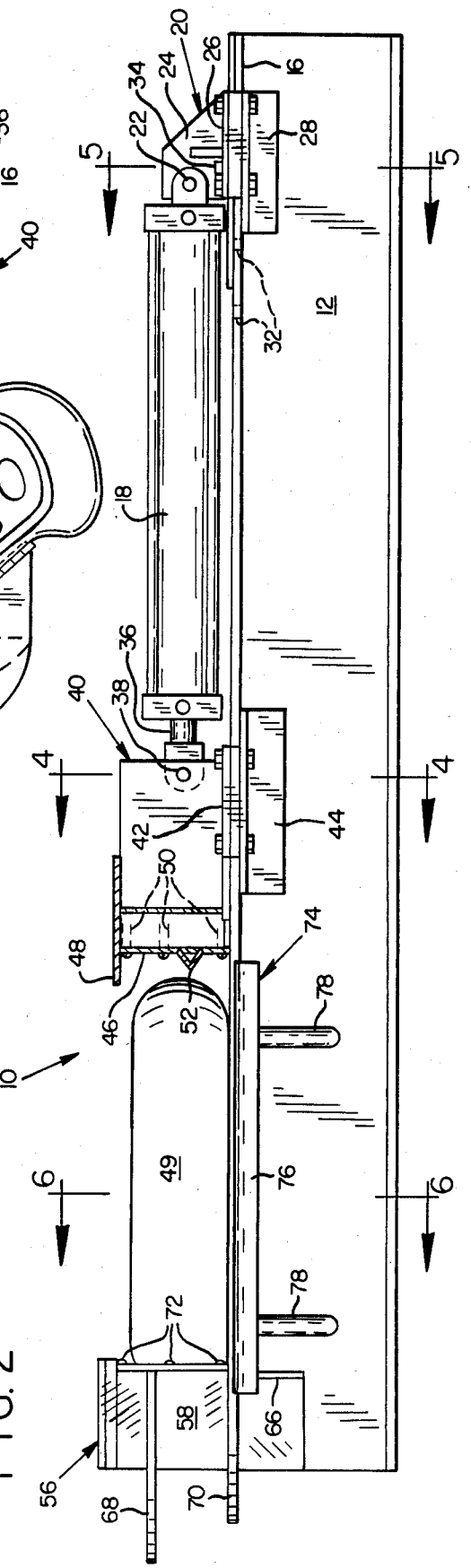

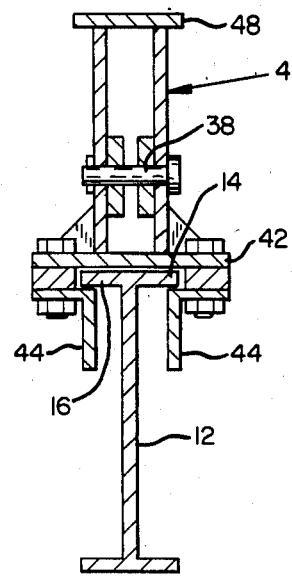
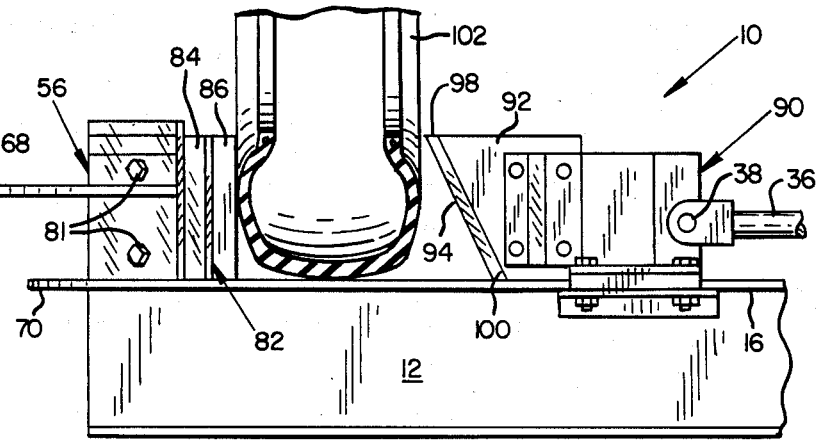
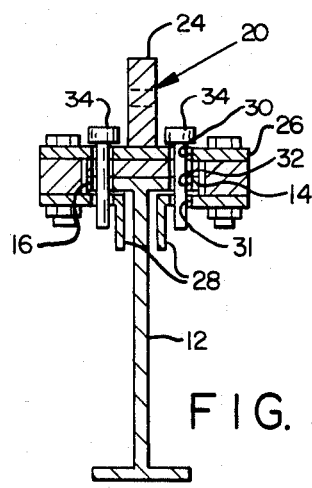
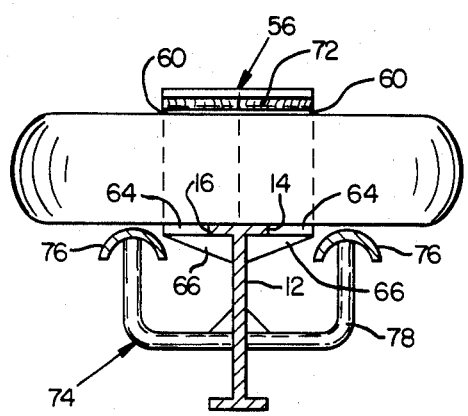
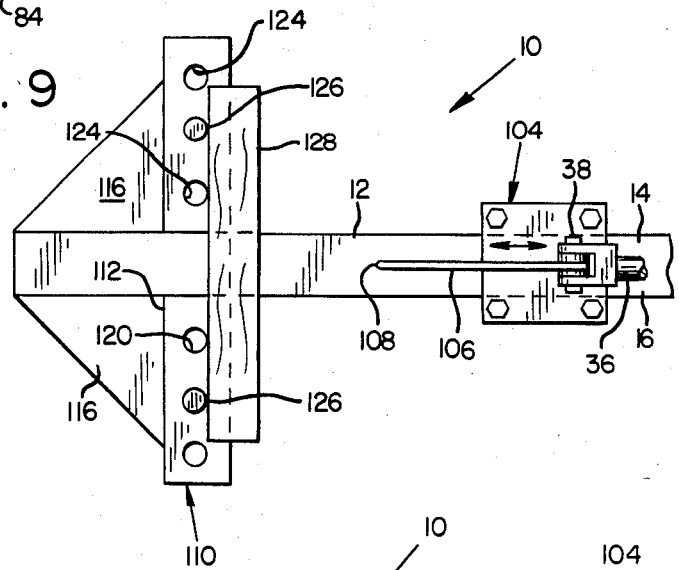
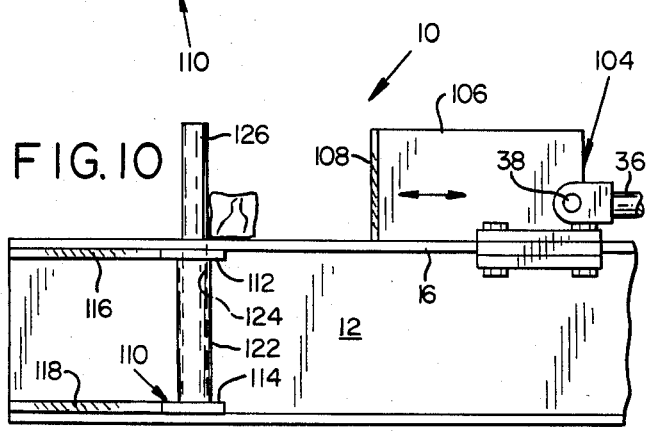

TIRE REMOVAL APPARATUS

BACKGROUND AND SUMMARY OF THE INVENTION

The present invention relates to initial processing of certain reclaimable waste materials, and particularly to apparatus usable to separate pneumatic or other rubber-like tires from discarded wheels, to reduce extremely large tires to smaller pieces, and to break large pieces of wood and similar waste materials into smaller pieces.

A continuing problem in the field of waste disposal is the treatment of discarded automobile and truck wheels and their tires. When motor vehicles are withdrawn from further use, their wheels of all sizes are frequently discarded, usually with their tires still mounted on the rims.

Some wheels are saved for further use when a vehicle is discarded, but if the wheels themselves have been damaged, are out of style, or are of sizes not commonly needed, the value of the wheel resides primarily in its scrap metal value. There is also value in the tires themselves, which can be cut or shredded into smaller pieces for use as fuel or in preparation for further processing. In order to make use of either the tires or the wheels, they must be separated from one another, although neither needs to be carefully handled. Thus, the primary objective to be met is economical and simple removal of tires from the wheels.

Extremely large tires, such as those used on earth moving equipment and the like, are usually removable from the wheels on which they are normally mounted through the use of detachable rim portions. However, such tires are large enough that it is difficult or impossible to reduce whole tire carcasses to pieces of smaller sizes by the use of most available tire shredding equipment. It is therefore desirable to cut such large tires into smaller pieces with a minimum of effort and special equipment.

Certain other waste materials, such as discarded wooden pallets or used lumber of odd sizes, are of little commercial value other than when broken up for use as fuel. However, because many of such scrap boards and the like are too large, they cannot be broken into small, easily handled pieces by normally-available waste processing equipment. It is therefore necessary to reduce the original size of such large pieces by other means, but without the use of saws and similar woodworking equipment which might be damaged by metal fasteners left in the materials.

In the past, these problems have been dealt with in various ways. Grasso U.S. Pat. No. 4,306,606 discloses apparatus for puncturing and stripping tires from automobile wheels simply by pushing the tires off to one side of the wheels. While such apparatus is apparently useful within a limited range of tire sizes, it appears likely that only parts of many tires would be torn free while other parts of such tires would remain attached to the wheels.

Heikkinen et al. U.S. Pat. No. 4,083,394, and Larsen U.S. Pat. No. 4,080,887 both disclose apparatus in which three hydraulicly operated rams bend the rims of automobile wheels radially inwardly at positions spaced 120 degrees apart from one another, in order to reduce the size of the wheels sufficiently to permit the tire to be removed easily from the wheel. Such equipment, however, is unnecessarily complex, and the use of three rams operating simultaneously creates unnecessary force balancing and timing problems, as well as the possibility that a wheel may bind itself to the head of one of the rams.

Sharp et al. U.S. Pat. No. 3,885,292 discloses a machine for removing tires from the wheels of junked automobiles, without removing the wheel from the automobile. The vehicle must be carried to the tire removal apparatus and positioned properly with respect to it, as a scissors-like arrangement shears the tire along a radial plane. Because the vehicle must be suspended during operation of the apparatus, it is considered unnecessarily difficult and unwieldy to use.

de Massacré U.S Pat. No. 4,050,144 discloses a device for removing puncture-proof inner tubes from tires through the use of a round-nosed ram pushed against a tire radially while the tire and tube are confined within a box-like portion of the apparatus. However, the apparatus does not appear to be particularly suited to removal of a tire from a wheel.

Barnes U.S. Pat. No. 3,020,831 discloses apparatus for pressing radially inwardly against the circumference of a circular object, but the apparatus described does not appear to be related to removal of tires from wheels.

Aluotto U.S. Pat. No. 3,643,590 discloses a baler press whose ram face includes horizontal grooves and bars to grip material being pressed.

None of the prior art known to the applicant, however, deals particularly with the problems of cutting extremely large tires into small pieces nor with breaking down large pieces of wood and the like into smaller pieces that can be further reduced in size by available machinery.

The present invention provides an apparatus intended to meet the need for a simple, yet rugged and effective machine for crushing vehicle wheels sufficiently to facilitate removal of the tires from wheels of most sizes. The apparatus embodying the invention may also be manufactured in or converted to a configuration permitting its use to cut very large tires along radial planes to divide such tires into smaller pieces which can be handled by existing rubber shredding apparatus. The apparatus may also be used in another configuration to break large pieces of wood and other building materials into small enough pieces to be handled by existing waste comminuting apparatus. In a preferred embodiment the apparatus of the present invention includes an elongate horizontal structural support member such as an I-beam on which a linear motor, for example, a fluid pressure-operated cylinder-and-piston assembly, is mounted adjustably. The linear motor drives a ram guided along the top of the beam, toward a stationary abutment structure located at the opposite end of the beam, so as to crush a wheel between the ram and the abutment structure. Preferably, the ram includes a punch for puncturing a tire to facilitate its removal.

In one configuration of the apparatus of the invention the ram is equipped with a knife and the abutment structure defines a slot for receiving the knife while supporting a large tire as the knife is used to cut the tire into pieces along radial lines.

In yet another embodiment of the invention a pair of arms extending transversely with respect to the main beam structure includes sockets to hold removable pins to support wooden boards and other breakable large items oriented transversely of the main beam member, while the ram is driven between the pins to break the breakable items into smaller pieces which can be further reduced by available waste-processing equipment.

It is therefore a principal object of the present invention to provide improved apparatus for removing tires from wheels to permit further reclamation processing of both the tires and the metal wheels.

It is another object of the present invention to provide apparatus which is efficiently able to reduce unusually large tires into smaller pieces.

It is yet a further object of the present invention to provide equipment capable of reducing other breakable large items into smaller pieces which can be handled by existing scrap processing equipment.

A principal feature of the present invention is a linear motor adjustably fastened to the main longitudinal structural member of the apparatus, so that it may be positioned optimally for crushing the rims of small wheels to remove tires therefrom, for crushing wooden pallets, or for cutting large tires into smaller pieces.

Another feature of the present invention is the provision of a pair of transverse arms defining sockets to receive upright pins which can be used to support long boards and other breakable items in position to be broken by the ram.

A principal advantage of the present invention is that it is simpler and more versatile than previously available apparatus for crushing wheels to remove tires therefrom.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a top plan view of an exemplary rim crushing apparatus embodying the present invention.

FIG. 2 is a side elevational view of the apparatus shown in FIG. 1.

FIG. 3 is a top plan view of a portion of the apparatus shown in FIG. 1, together with a wheel being crushed.

FIG. 4 is a sectional view of the apparatus shown in FIG. 2, taken along line 4—4.

FIG. 5 is a sectional view of the apparatus shown in FIG. 2, taken along line 5—5.

FIG. 6 is a sectional view of the apparatus shown in FIG. 2, taken along line 6—6, showing the members used to support a wheel and tire atop the main beam of the apparatus.

FIG. 7 is a side elevational view of a portion of the apparatus shown in FIGS. 1-5, as modified for use in cutting very large tires along radial planes, to provide smaller pieces to be processed further.

FIG. 8 is a top plan view of the apparatus shown in FIG. 7.

FIG. 9. is a top plan view of a portion of an alternative embodiment of the apparatus shown in FIGS. 1-5, for breaking large breakable items into smaller pieces.

FIG. 10 is a side elevational view of the apparatus shown in FIG. 9.

DETAILED DESCRIPTION OF THE INVENTION

Referring now to the drawings, FIGS. 1 and 2 show an exemplary apparatus 10 which is useful for removing tires from wheels and whose main longitudinal structural member is an elongate main beam member 12, such as a piece of 6"×18" steel I-beam, approximately 13½' in length. Flanges 14, 16 extend laterally from the top of the main beam 12 on respective sides thereof along its entire length, as is normal for an I-beam.

A linear motor, such as a hydraulic cylinder and piston assembly 18, is located atop the main beam 12. The cylinder and piston assembly 18 is of the double-acting type, and the usual hydraulic connecting tubing, control valves, pressure relief valves, pump, and pump motor are provided to permit control of operation of the cylinder and piston assembly 18. One end of the cylinder is pivotably attached to a motor mounting 20 by means of a pin 22, extending transversely through an upright central plate 24 of the mounting 20. A pair of opposite ears provided on the end of the cylinder and piston assembly, as in the normal configuration for a hydraulic cylinder and piston assembly.

The motor mounting 20, shown also in FIG. 5, includes a base plate 26 to which the upright central plate 24 is attached. A pair of lower guides 28, constructed of angle stock, are attached beneath the base plate 26 by appropriate bolts or equivalent fasteners, with spacers located between the base plate 26 and the lower guides 28 corresponding to the thickness of the flanges 14, 16. Locating pin holes 30 are provided in the base plate 26, and corresponding locating pin holes 31 are provided in the lower guides 28 in alignment with those in the base plate 26. A plurality of sets of locating pin holes 32 are provided in the flanges 14 and 16, spaced apart from one another along the length of the main beam 12, to permit the mounting 20 to be held in a desired position along the main beam 12 by insertion of a pair of fasteners such as the locating pins 34 to extend through the locating pin holes 30, 31 and 32 when the mounting 20 is in a selected position along the main beam 12.

The extendable and retractable piston rod 36 of the cylinder and piston assembly 18 is connected by a transverse piston connecting pin 38 extending through the usual hole provided in an eye attached conventionally to the outer end of the piston rod 36, to connect the piston rod 36 to a ram 40 which is slidably located atop the main beam 12. The ram 40 is connected to the flanges 14, 16 by a slide assembly including a base plate 42 of the ram 40 and a pair of lower guide members 44 located beneath the flanges 14, 16 and fastened to the base plate 42, with appropriate spacers being located between the lower guide members 44 and the base plate 42, also shown in FIG. 4. The lower guide members 44, may, for example, be appropriate lengths of metal angle stock. For example, a section of 4"×5"×⅜" angle stock 21" long, with the 5" side extending downwardly beneath the flanges 14 and 16, has been found appropriate. A member 46 of the ram is of heavy plate material, for example ⅜" thick, bent to a "U" shape with the legs of the U directed toward the cylinder 18. The height of the upright member 46 is great enough to accommodate the width of the rims of wheels for which the apparatus is intended to be used. For example, an upright member 46 twelve inches high is appropriate to handle rims designed for tires up to a size of 10.00×22, a large truck tire size. A front end of the ram 40 is provided with a generally semi-cylindrical, rounded nose surface 47 having a vertical axis defined by the bottom of the U shape. A horizontal cap plate 48 is provided at the top of the ram 40, extending forward beyond the rounded nose 47, to restrain a tire against rising along the nose of the ram 40, and is welded to the central member 46 to support it structurally. A plurality of horizontal, outwardly protruding members 50, which may be of concrete reinforcement bar material, are attached, as by welding to the surface of the upright member 46, also to resist any tendency of a tire to slip upwardly along the face of the ram 40 during operation of the apparatus. A punch 52, having a forwardly projecting sharpened point, extends beyond the horizontal bars 50 so that tires capable of holding internal pressure will be punctured, permitting the ram 40 to proceed toward the rim 54 of a discarded wheel as the hydraulic cylinder and piston assembly is operated to force the ram 40 along the main beam 12 away from the motor mounting 20.

Referring again particularly to FIGS. 1, 2, and 5, an upwardly extending abutment structure 56 located at the end of the main beam 12 opposite the motor mounting 20 includes a pair of upright members 58 having substantially planar front faces 60 which intersect one another centrally of the main beam 12. The upright members 58 intersect one another in a generally vertical line of intersection defining an interior angle 62 facing toward the ram 40. The angle 62 is substantially bisected by the longitudinal central axis of the main beam 12. While the size of the interior angle 62 is not critical, an interior angle 62 of 90° has been found satisfactory. Gussets 64 and 66, diagonal brace plates 67, and horizontal and vertical bracing plates 68 and 70 provide additional rigidity to the abutment structure 56, supporting the upright members 58, which support the tire 49 and rim 54 against the pressure of the ram 40 during the operation of the apparatus 10.

In order to prevent vertical slippage of the tire 49 along the abutment structure 56, horizontal ridges are provided on the faces 60, as by welding concrete reinforcing bar material 72 to the faces 60 at upper, lower, and mid-height locations.

In order to better support a wheel during its removal from a tire, a pair of tire rests 74 are provided adjacent the upright abutment structure 56, with one tire rest 74 being located spaced appropriately distant from each side of the main beam member 12. A satisfactory tire rest includes a longitudinal half of a section of 6" diameter length of pipe 76 of an appropriate length, for example, 4', supported by tire rest arms 78 of smaller piping, for example, 2" in diameter, extending laterally and thence vertically from the main beam member 12 and attached to it low enough to leave sufficient clearance for the slide assembly of the ram 40.

The apparatus shown in FIGS. 1–5 is used by placing a discarded wheel carrying a reclaimable tire 49 atop the main beam member 12, centered over the main beam member 12 and the tire rests 74, with the ram 40 withdrawn toward the motor mounting 20 by the hydraulic cylinder and piston assembly 18. The hydraulic cylinder and piston assembly 18 is then extended, forcing the ram 40 against the tire 49 so that the punch 52 punctures the tire 49, if it is inflated. The ram 40 pushes the tire 49 against the rim 54, consequently also squeezing the tire between the upright abutment structure 56 and the rim 54 on the side diametrically opposite the ram 40. As the ram 40 is driven further toward the abutment structure 56, the force exerted by the cylinder and piston assembly 18 causes the ram 40 to bend the rim 54, crushing it radially inward to form a heart shape, and reducing its diameter, as the faces 60 of the upright members 58 hold and centralize the rim 54 in a position ahead of the ram 40. The resulting size of the rim 54 is small enough so that it will fall from within the tire 49, making the tire available to be shredded and further processed, and leaving the bare wheel reduced in volume and available to be disposed of as scrap metal.

Referring now to FIGS. 7 and 8, in an alternative configuration of the apparatus of the invention which is intended to cut extra large tires, such as those used on earth moving equipment, into smaller segments, the main beam member 12, the cylinder and piston assembly 18, and the motor mounting 20 of the apparatus 10 are used. In the tire-cutting configuration of the apparatus 10 an auxiliary abutment structure 82 is held within the interior angle 62 of the abutment structure 56 by suitable fasteners such as bolts 81. The auxiliary abutment structure 82 includes a pair of upstanding members 84 intersecting each other and connected with one another to form an exterior angle equal to the interior angle 62 between the upright members 58. A pair of parallel planar blade guides 86 extend vertically and are aligned with the length of the main beam member 12, with one of the planar blade guide members 86 being located on each side of the center line of the main beam member 12, as may be seen best in FIG. 8. A pair of reinforcing gusset members 88 extend horizontally between each upstanding member 84 and the respective closer one of the blade guide members 86.

A cutter head 90 is generally similar to the ram 40 in its attachment to the hydraulic cylinder and piston assembly 18 and to the flanges 14, 16 of the main beam member 12. However, the cutter head 90 carries an upright blade member 92 which is generally planar and has an inclined sharpened edge 94 facing toward the space 96 defined between the blade guide members 86. The edge 94 is diagonally inclined with respect to the vertical, with an upper end 98 of the edge 94 being closer than the lower end 100 to the blade guides 86. Thus, when an extra large tire 102 is positioned against the auxiliary abutment structure 82, the ram 90 can be extended until the blade 92 enters the slot 96 defined between the blade guides 86. The edge portions of the blade guides 86 support the tire 102 as the sharpened edge 94 of the blade 92 cuts through it along a radial plane. The cutter head 90 is then withdrawn by the cylinder-and-piston assembly 18, and the remainder of the tire 102 is repositioned between the cutter head 90 and the auxiliary abutment structure to permit the apparatus to make another radial cut to cut free a further segment of the tire 102. As an alternative to a separate cutter head 90, a blade may be attached to the ram 40 to extend forward therefrom so as to be movable by the ram 40 to extend between the blade guides 86.

Depending upon the length of stroke available in the hydraulic cylinder-and-piston assembly 18, the mounting 20 may need to be moved closer to the abutment structure 56 by removing the locating pins 34 and sliding the mounting 20 until the locating pin holes 30 and 31 are lined up with a pair of locating pin holes 32 which are closer to the abutment structure 56 than those used when the apparatus is used as a rim crusher.

In a third configuration of the apparatus 10 of the present invention, shown in FIGS. 9 and 10, a ram 104, connected with the cylinder and piston assembly 18 and guided by the main beam 12 as is the ram 40, is equipped with a vertical blade 106 having a vertical leading edge 108 instead of the rounded nose of the ram 40. The vertical leading edge 108 may be sharpened, but need not be. A transverse cross arm structure 110 is attached to the main beam member 12, as by welding, and consists in a preferred embodiment of similar upper and lower plates 112, 114 supported by horizontal gussets 116 and 118, also welded to the main beam member 12 on each side. A plurality of pin sockets 124 are defined by respective holes 120 extending through the upper and lower plates 112 and 114 and aligned with one another. Lengths 122 of pipes are preferably welded in place vertically between corresponding ones of the holes 120, and are welded to the upper and lower plates 112, 114 to define sockets 124.

Upright pins 126 may be placed in the sockets 124 as shown in FIG. 8, so that a piece of lumber 128 may be placed to extend transversely of the main beam member 12, between the pins 126 and the ram 104, so that when the ram 104 is driven by the cylinder and piston assembly 18 to bring the edge 108 to bear against the piece of lumber 128, the piece of lumber 128 can be broken into smaller pieces. The apparatus 10 of the invention in this configuration can be used to break apart discarded wooden pallets and the like which are too large and unwieldy to be handled by available waste processing equipment in their original form.

From the foregoing it will be seen that the apparatus of the present invention is useful in initial separation of tires from discarded motor vehicle wheels, and for initial reduction in size of very large tires, and other large objects which must be reduced in size before conventional scrap handling equipment is capable of further reducing such items to small pieces.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and claimed only the by the claims which follow.

What is claimed is:

1. A device for deforming metal wheels in order to facilitate separation of tires therefrom, comprising:
    (a) an elongate horizontal main structural beam member having a length and a pair of opposite sides;
    (b) a linear motor located atop said main structural beam member and having a portion thereof attached thereto;
    (c) a ram head drivably connected to said linear motor and movable longitudinally of said main structural beam member by said linear motor said ram head being configured to engage and deform metal wheels;
    (d) an upwardly extending abutment structure attached to said main structural beam member and spaced apart from said linear motor longitudinally of said main structural beam member, said abutment structure and ram head lying in a straight line parallel with said longitudinally extending main structural beam member, said abutment structure including a pair of fixed upright members each having a respective upright, generally planar face, said planar faces defining an interior angle said pair of upright members being located with said interior angle facing toward said ram, so as to hold a wheel and tire generally stationary during movement of said ram toward said abutment structure; and
    (e) means for supporting a wheel in a horizontal attitude adjacent said abutment structure so that the axis of the wheel extends vertically, between said ram head and said abutment structure.

2. The apparatus of claim 1, including at least one bar welded to and extending generally horizontally along each said planar face of said abutment structure.

3. The apparatus of claim 1 wherein said abutment structure includes a horizontal brace plate located upwardly spaced apart from said main structural member and supportingly attached to said upright members of said abutment structure.

4. The apparatus of claim 1, said ram having an arcuate face, said arcuate face having a plurality of outwardly protruding, tire-engaging horizontal portions associated therewith.

5. The apparatus of claim 4, said ram further including a punch protruding forwardly beyond said face thereof.

6. The apparatus of claim 1 wherein said linear motor is attached to said main structural member by a mounting which is slidable along said main structural member, said main structural member and said mounting defining corresponding apertures therein and said mounting having removable fastener means for fitting in said corresponding apertures and positioning said linear motor selectively in any of a plurality of positions along said main structural member.

7. The device of claim 1 wherein said means to support a wheel in a horizontal attitude comprises a pair of wheel rests, the ones of said pair being spaced apart from sides opposite sides of said main structure member at positions appropriate to support a wheel atop said wheel rests.

8. The device of claim 1 wherein said abutment structure further includes a pair of upright members, each having a respective upright, generally planar face, said planar faces intersecting each other and defining an interior angle, said pair of upright members being located with said interior angle facing toward said ram, so as to hold a wheel and tire generally stationary during movement of said ram toward said abutment structure.

9. The apparatus of claim 8, including at least one bar welded to and extending along each said face of said abutment structure.

10. The apparatus of claim 8, wherein said abutment structure includes a horizontal brace plate located upwardly spaced apart from said main beam member and supportingly attached to said upright members of said abutment structure.

11. The apparatus of claim 8, said ram having a generally semi-cylindrical face having a vertical axis, and said face having a plurality of outwardly protruding, tire-engaging horizontal portions associated therewith.

12. The apparatus of claim 11, said ram including a punch protruding forwardly beyond said face thereof.

13. The apparatus of claim 8 wherein said linear motor is attached to said main beam member by a mounting which is slidable along said main beam member, said main beam member and said mounting defining corresponding apertures therein and said mounting including removable fastener means for fitting in said corresponding apertures and positioning said linear motor selectively in any of a plurality of positions along said main beam.

14. A device for deforming metal wheels in order to facilitate separation of tires therefrom, comprising:
    (a) an elongate horizontal main structural beam member having a length and a pair of opposite sides;
    (b) a single linear motor located atop said main structural member and having a portion thereof attached thereto;
    (c) an upwardly extending abutment structure attached to said main structural beam member and having a fixed surface for engaging a wheel and tire assembly and spaced apart from said single linear motor longitudinally of said main structural member;

(d) means associated with said main structural beam member for supporting a wheel in a horizontal attitude adjacent said abutment structure so that the axis of the wheel extends vertically; and (e) ram head means drivably connected to said single linear motor and movable longitudinally of said main structural member, toward said abutment structure, by said single linear motor, for deforming a metal wheel by acting substantially diametrically thereon, said abutment structure and ram head lying in a straight line parallel with said longitudinally extending main structural beam member.

* * * * *